ated Examiner—Gene A. Church
United States Patent [19]
Cruse

[11] 3,746,400
[45] July 17, 1973

[54] BRAKE SYSTEM
[75] Inventor: Oliver B. Cruse, Florissant, Mo.
[73] Assignee: Wagner Electric Corporation, Newark, N.J.
[22] Filed: Apr. 3, 1972
[21] Appl. No.: 240,456

Related U.S. Application Data
[62] Division of Ser. No. 117,958, Feb. 23, 1971.

[52] U.S. Cl. .................................. 303/9, 303/68
[51] Int. Cl. .................................. B60t 13/46
[58] Field of Search .................. 303/6, 9, 13, 52, 303/68; 137/116, 596.2, 627.5

[56] References Cited
UNITED STATES PATENTS
3,504,946   4/1970   Valentine et al. ........................ 303/9
3,309,149   3/1967   Bueler ................................... 303/13
3,549,208   12/1970  Cruse .................................. 303/9 X Primary Examiner—Allen N. Knowles
Assistant Examiner—Gene A. Church
Attorney—Joseph E. Papin

[57] ABSTRACT

A brake system for a vehicle having an axle set of brakes adapted for energization in response to spring setting pressure released brake actuators connected therewith is provided with an operator actuated application valve for selectively venting fluid pressure from said brake actuators to effect spring set energization of said axle set of brakes, and an emergency brake valve is also responsive to the selective venting of the fluid pressure from said brake actuators to apply fluid pressure to the other axle set of brakes of said vehicle and effect fluid pressure energization thereof. The emergency brake valve is provided with valve means for controlling the application of fluid pressure therethrough, and a resiliently urged member responsive to control fluid pressure less than a predetermined value for actuating said valve means.

16 Claims, 3 Drawing Figures

PATENTED JUL 17 1973                    3,746,400

3,746,400

BRAKE SYSTEM

This application is a division of co-pending application Ser. No. 117,958 filed Feb. 23, 1971.

This invention relates in general to vehicle brake systems and in particular to such systems utilizing spring set brake actuators and emergency brake valves for controlling a portion of such system.

SUMMARY

In the past dual braking systems, spring setting pressure released brake actuators of a type well-known in the art were utilized to energize the rear axle set of brakes on trucks, tractors of a tractor-trailer train, or other like vehicles. For instance, in the event of a fluid pressure failure in the service portion of the dual system, it was possible for the vehicle operator to meter emergency fluid pressure from the spring setting pressure released brake actuators to effect a spring set energization of the rear axle set of brakes under these emergency conditions to stop the vehicle. One of the disadvantageous or undesirable features of such past brake system was their inability to utilize the front axle set of vehicle brakes to effect the vehicle stop under such emergency conditions since such front axle brakes were energized by the service portion of the system.

The primary object of the present invention is to provide a brake system and an emergency brake valve for use therein which overcomes the aforementioned disadvantageous or undesirable features of the past brake systems, and this, as well as other objects and advantageous features of the present invention, will become apparent hereinafter.

Briefly, the present invention comprises a brake system having a pair of brakes, one of which is spring set energized by a spring setting pressure released actuator generally operable in response to fluid pressure supplied thereto less than a predetermined value, and other means responsive to the supplied fluid pressure less than the predetermined value for applying fluid pressure to effect energization of the other of said brakes. The invention also includes a control valve having resiliently urged means responsive to a control fluid pressure less than a predetermined value for effecting the application through said control valve of operating fluid pressure.

RELATED PATENTS

This patent application is related generally to the Richard C. Bueler U.S. Pat. No. 3,309,149 issued Mar. 14, 1967, the H. M. Valentine et al. U.S. Pat. No. 3,504,946 issued Apr. 7, 1970, and the Oliver B. Cruse U.S. Pat. No. 3,533,661 issued Oct. 13, 1970; however, this present patent application is a patentably distinct improvement.

DESCRIPTION OF THE DRAWINGS

In the drawings which form a part of the specification and wherein like numerals refer to like parts wherever they occur.

Figure 1:
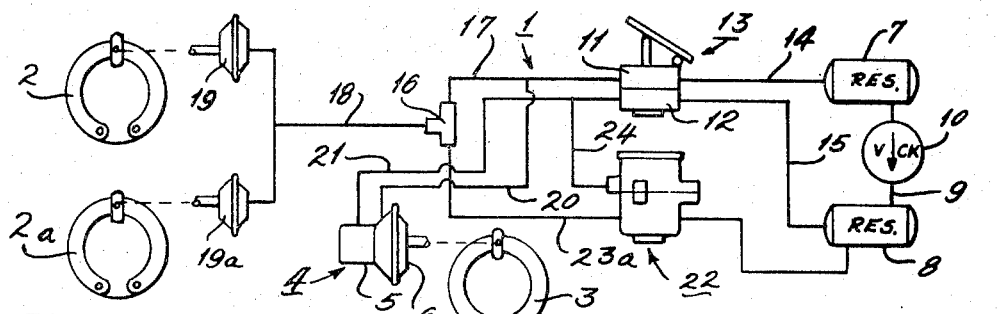
FIGS. 1 and 2 are schematic diagrams of brake systems embodying the present invention.

Referring now to the drawings in detail and in particular to FIG. 1, a dual fluid pressure or brake system 1 is shown for use on a truck, a tractor of a tractor-trailer train, or other such vehicles having a front axle brake set 2-2a and a rear axle brake set 3 controlled by spring setting pressure released brake cylinders or actuators 4 of a type well-known in the art and including emergency or spring set portions 5 and service or fluid pressure responsive motors 6 for energizing the rear brakes; however, for the sake of expediency only one rear axle brake 3 and spring set actuator 4 therefor is shown.

A reservoir or source of service fluid pressure 7 is fed from a compressor (not shown) and connected with another reservoir or source of emergency fluid pressure 8 by a conduit 9 having a uni-directional flow or check valve 10 interposed therein, and said service and emergency sources are connected to the inlet sides of service and emergency portions 11, 12 of a dual application valve 13 by conduits 14, 15, respectively. The application valve 13 may be of the type disclosed in my U.S. Pat. No. 3,533,661 issued Oct. 13, 1970 or of the type shown in the Richard C. Bueler U.S. Pat. No. 3,309,149 issued Mar. 14, 1967. The outlet side of the application valve service portion 11 is connected through a two way check valve 16 by a conduit 17 to another conduit 18 which branches to connect with fluid pressure responsive motors or brake chambers 19, 19a, and said brake chambers are operatively connected by suitable means well-known in the art (not shown) with the front axle brakes 2, 2a to effect energization thereof. Conduit 20 has one end connected to the conduit 17 between the outlet side of the application valve service portion 11 and the two way check valve 16 while the other end thereof is connected with the service or fluid pressure responsive motor portion 6 of the spring set actuator 4, and another conduit 21 is connected between the outlet side of the application valve emergency portion 12 and the emergency or spring setting portion 5 of the spring set actuator 4. To complete the description of the system 1, the inlet and outlet ports of an emergency brake or control valve 22 are respectively connected with conduits 23, 23a which are, in turn, respectively connected with emergency reservoir 8 and the two way valve 16, and a control conduit 24 is connected between the conduit 21 and the control port of said emergency brake valve.

The control or emergency brake valve 22 is provided with upper and lower housings 25, 26 having a seal connected by suitable means such as studs 28. The upper housing 25 is provided with an integral, radially extending wall portion 29 adjacent to its lower or interior end 30, and upper and lower counterbores 31, 32 are provided in said housing 25 being interconnected by a bore 33 extending through said wall portion. A closure member 34 is connected to the upper end of the housing 25 by suitable means such as studs 35 closing the open end of the counterbore 31, and a control or supply port 36, which receives the conduit 24 as previously mentioned, is provided in the housing 25 intersecting with the counterbore 31 adjacent to the wall 29. Application or resiliently urged means, such as interconnected piston members 37, 38 are slidably received in the counterbores 31, 32, and carry peripheral seals 39, 40 in sealing engagement with said counterbores, respectively. An expansible fluid pressure or control chamber 41, is defined in the counterbore 31 between the housing wall 29 and piston 37 connected in pressure fluid communication with the control port 36 at all times, and an emergency or metering spring 42 is precompressed between said piston and the closure member 34 opposing fluid pressure expansion of said chamber. An aperture 43 is centrally provided in the piston 37 which sealably receives the upper or connecting end portion 44 of an extension 45 provided on the piston 38, and the piston 38 is fixedly connected with the piston 37 by suitable means, such as the nut 46 which is threadedly received on said end portion. The extension 45 is slidable in the housing bore 33 carrying a peripheral seal 47 in sealing engagement with said housing bore, and the piston 38 is also provided with an opposing extension 48 having a free end therein defining a valve seat 49, to be discussed hereinafter.

The housing 26 is provided with a bore 50 defining an outlet chamber into which the lower end 30 of the housing 25 extends coaxially, and a passage 51 is provided in the housing 26 between said bore and an inlet chamber 52. Inlet and outlet ports 53, 54, which receive the conduits 23, 23a, as previously mentioned, are provided in the housing 26 connecting with the bore 50 and the inlet chamber 52, respectively, and a valve seat 55 is provided on the housing 26 about the passage 51 and facing the inlet chamber 52. A valve guide member 56 is seated in displacement preventing engagement with a snap ring angle groove assembly 57 provided adjacent to the lower end of the inlet chamber 52 which also defines an exhaust port. The valve guide 56 is provided with an axial bore 58 in which a valve member 59 is slidably received, and seals 60, 61 are carried in said valve guide in sealing engagement with the inlet chamber 52 and said valve member. The valve member 59 is provided with an exhaust passage or opening 62 therethrough normally providing pressure fluid communication between the outlet chamber and port 50, 54 and the atmosphere, and an annular resilient seal or disc 63 is provided on the upper end of said valve member in circumscribing relation with said exhaust passage. A valve spring 64 is biased between the valve guide 56 and the valve member 59 normally urging the valve member seal 63 into sealing engagement with the housing valve seat 55 to interrupt pressure fluid communication between the inlet and outlet ports 53, 54. To complete the description of the control valve 22, it should be noted that the pistons 37, 38 are provided with additive areas $A_1$, $A_2$ which are subjected to fluid pressures in the control and outlet chambers 41, 50, respectively.

Figure 2:
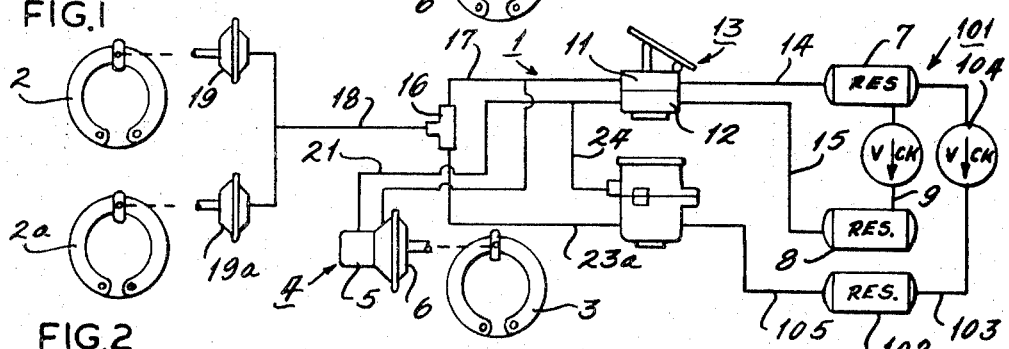

In the operation of the system 1, assuming that the service reservoir 7 is fully charged from the compressor (not shown), the fluid pressure flows therefrom through the conduit 9 and check valve 10 into the emergency reservoir 8 and therefrom through the conduit 15 to the inlet side of the application valve emergency portion 12. Normally the application valve emergency portion 12 establishes pressure fluid communication between the inlet and outlet sides thereof in response to the emergency fluid pressure to transmit a supplied or control emergency fluid pressure from the conduit 15 through the conduit 21 to the brake actuator 4 in order to disable the emergency spring setting portion 5 thereof. The supplied or control emergency fluid pressure in the conduit 21 also flows through the conduit 24 and control port 36 of the control valve 22 into the control chamber 41 acting on the effective area $A_1$ of the piston 37 to establish a force $F_1$ to urge the pistons 37, 38 toward their inoperative positions, as shown in FIG. 2, against the compressive force of the spring 42.

In order to effect a normal service braking application, the operator applies a manual force on the application valve 13 to actuate the service portion 11 thereof which effects the application of fluid pressure from the service reservoir 7 through the conduits 14, 17, the two way check valve 16, and the conduit 18 to actuate the front brake chambers 19, 19a and energize the front brakes 2, 2a. At the same time, the applied service fluid pressure also flows from the conduit 17 through the conduit 20 to actuate the service motor portion 6 of the rear brake actuator 4 and effect service energization of the rear brakes 3 substantially simultaneously with the service energization of the front brakes 2, 2a. When the desired service braking vehicle deceleration or complete stop is effected, the operator applied force is removed from the application valve 13 wherein the service portion 11 thereof again isolates the service reservoir 7 and vents the applied service fluid pressure from the brake chambers 19, 19a through the conduit 18, the two way check valve 16, the conduit 17 and said application valve service portion to the atmosphere thereby de-energizing the front brakes 2, 2a. At the same time, the applied service fluid pressure is also vented from the service motor portion 6 of the rear brake actuator 4 through the conduit 20 and the application valve service portion 12 to de-energize the rear brakes 3.

In the event of a fluid pressure failure in the service reservoir 7, it should be noted that the integrity of the emergency reservoir 8 is preserved by the check valve 10. Under these emergency conditions of service fluid pressure failure, the operator applies a manual force on the application valve 13 to actuate the emergency portion 12 thereof which initially isolates the inlet side thereof and the emergency reservoir 8 from the outlet side thereof and thereafter vents the supplied emergency fluid pressure from the emergency spring set portion 5 of the rear brake actuator 4 through the conduit 21 and said application valve emergency portion to the atmosphere. When the supplied emergency fluid pressure at the emergency spring set portion 5 of the rear brake actuator 4 is so reduced to a predetermined value, the spring setting portion 5 of said brake actuator is actuated and effects a spring set energization of the rear brakes 3. Of course, the aforementioned venting of the supplied emergency fluid pressure by the application valve emergency portion 12 also effects simultaneous venting of the supplied emergency fluid pressure from the control chamber 41 of the control valve 22 through the control port 36 thereof and the conduit 24. When the emergency fluid pressure in the control chamber 41 is thereby also reduced to the predetermined value, the compressive force of the spring 42 overcomes the opposing control force $F_1$ to urge the pistons 37, 38 downwardly from their inoperative position toward an operative position to initially engage the valve seat 49 of the piston 38 with the valve member 59 closing the exhaust passage 62 thereof to isolate the outlet chamber and port 50, 54 from the atmosphere and thereafter move said valve member an open position disengaged from the housing valve seat 55 to establish metered pressure fluid communication between the inlet and outlet ports 53, 54. In this manner emergency fluid pressure is applied or metered directly from the emergency reservoir 8 through the conduit 23, the inlet chamber and port 52, 53 of the control valve 22, the passage 51 and the outlet chamber and port 50, 54, the conduit 23a, the two way valve 16 and the conduit 18 to actuate the front brake chambers 19, 19a and effect emergency fluid pressure energization of the front brakes 2, 2a substantially simultaneously with the emergency energization of the rear brakes 3. The applied emergency fluid pressure so established in the outlet chamber 50 of the control valve 22 acts on the effective area $A_2$ of the piston 38 to establish another force $F_2$ which is additive to the force $F_1$ to oppose further movement of the pistons 37, 38 in response to the compressive force of the emergency spring 42 acting thereon, and when the additive forces $F_1$, $F_2$ attain a value equal to the compressive force of the emergency spring 42, the pistons 37, 38 are moved upwardly against said spring until the valve member 59 is positioned in lapped engagement with the housing valve seat 55 and the piston valve seat 49. Of course, if greater emergency braking is desired, the manual force on the application valve emergency portion 12 is increased to effect further venting of the supplied emergency fluid pressure from the spring setting portion 5 of the rear brake actuator 4 and the control valve 22 to the atmosphere, and the component parts of the system 1 and control valve 22 function in the same manner, as above described.

When the desired emergency braking effect is attained under the emergency conditions, the manually applied force is removed from the application valve 13 causing the emergency portion 12 thereof to initially interrupt the pressure fluid communication between the atmosphere and conduits 20, 24 and thereafter re-establish pressure fluid communication between the emergency reservoir 8 and said conduits to again supply emergency fluid pressure in excess of the predetermined value from said emergency reservoir through the conduit 15, said application valve emergency portion and the conduit 21 into the brake actuator 4 to again disable the spring setting portion 5 thereof and effect a de-energization of the rear brakes 3. At the same time the supplied emergency fluid pressure in excess of the predetermined value also flows from the conduit 21 through the conduit 24 and the control port 36 of the control valve 22 into the control chamber 41 thereof to re-establish the force $F_1$. Upon the reestablished force $F_1$, the pistons 37, 38 are moved upwardly thereby toward their inoperative position against the compressive force of the emergency spring 42, and in this manner the valve seat 49 is disengaged from the valve member 59 to open the valve member exhaust passage 62 and effect the exhaustion of the applied emergency fluid pressure from the front brake actuators 19, 19a through the conduit 18, the two way valve 16, the conduit 23a, the control valve outlet port 54 and outlet chamber 50 and said valve member exhaust passage to the atmosphere thereby effecting de-energization of the front brakes 2, 2a substantially simultaneously with the de-energization of the rear brakes 3. Of course, the venting of the applied emergency fluid pressure to the atmosphere eliminates the force $F_2$ from the piston 38.

In the event that the emergency fluid pressure in the emergency tank 8 is depleted to a value less than the predetermined value due to system actuation or leaks or the like, the spring setting portion 5 of the rear brake actuator 4 and the control valve 22 will function, as above described, to effect the emergency energization of the front and rear brakes 2, 2a and 3.

Figure 3:
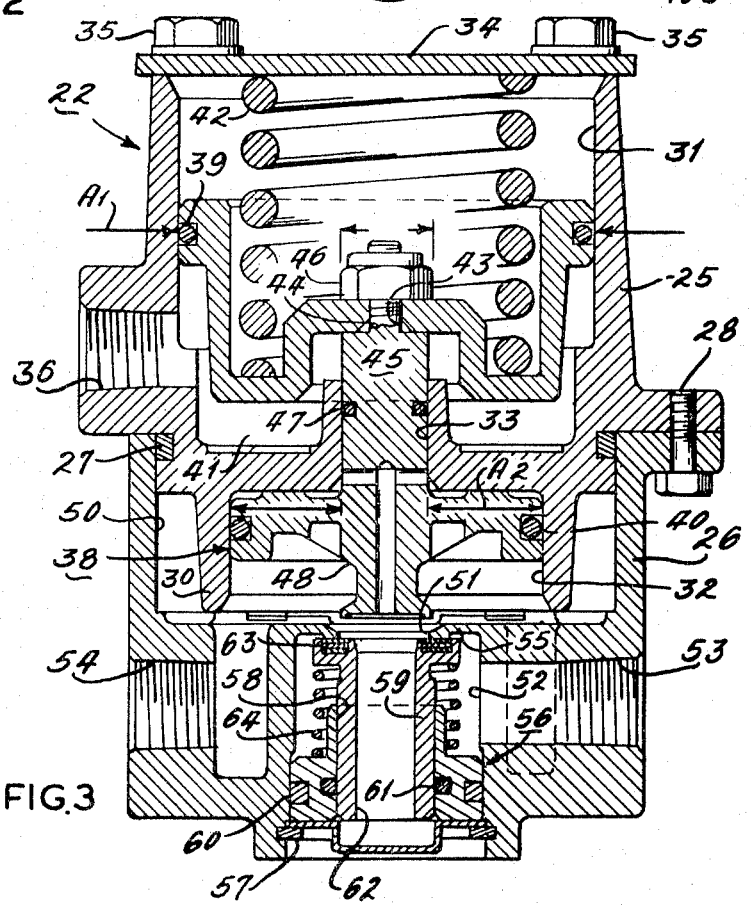
FIG. 3 is a sectional view illustrating a control valve of the system of FIG. 1 in cross-section and also embodied in the present invention.

Referring now to FIG. 3, a fluid pressure system 101 is shown having substantially the same component parts and functioning in substantially the same manner as the previously described system 1 with the following exceptions. In the system 101, another reservoir or source of emergency fluid pressure 102 is connected with the service reservoir 7 by a conduit 103 having a uni-directional or check valve 104 interposed therein, and another conduit 105 is connected between the emergency reservoir 102 and the inlet port 53 of the control valve 22. In this manner, the check valve 104 preserves the fluid pressure integrity of the emergency reservoir 102 in the event of the depletion of fluid pressure in the emergency reservoir 8, as discussed hereinabove; therefore, full system pressure is always available for application from the emergency reservoir 102 through the conduit 105, the control valve 22, the conduit 23a, the two way check valve 16, and the conduit 18 to actuate the front brake chambers 19, 19a and effect emergency fluid pressure energization of the front brakes 2, 2a.

While front and rear brakes 2, 2a and 3 and front and rear brake actuators 19, 19a and 4 therefor have been discussed therein, it is obvious that such brakes and brake actuators can be employed on the rear axles of a tandem axle vehicle, and such use is contemplated by the invention.

It is now apparent that novel fluid pressure systems 1, 101 and a control valve 22 therefor meeting the objects and advantages set out hereinbefore, as well as other objects and advantages apparent from the disclosure, are provided and that changes in the mode of operation or the precise configurations, shapes or details of the constructions set forth in the disclosure by way of illustration may be made by those skilled in the art without departing from the spirit of the invention.

The embodiments of the invention in which an exclusive property or privilege is claimed are defined as follows:

1. A fluid pressure system comprising a pair of brakes, a pair of fluid pressure sources, means for energizing said brakes in response to fluid pressure selectively applied thereto from one of said sources, a spring setting pressure released brake actuator connected with one of said brakes and operable in response to fluid pressure supplied thereto less than a predetermined value from the other of said sources to effect spring set energization of said one brake, and other means responsive to the fluid pressure less than the predetermined value supplied from said other source to said brake actuator for applying fluid pressure from said other source to the other of said brakes to also effect energization thereof.

2. A fluid pressure system comprising a pair of brakes, a pair of fluid pressure sources, first means responsive to fluid pressure selectively applied thereto from one of said sources for energizing at least one of said brakes, second means responsive to fluid pressure supplied thereto from the other of said sources less than a predetermined value for energizing the other of said brakes, and third means for applying fluid pressure from said other source to said first means to effect energization of said one brake in the event the supplied fluid pressure is reduced to a value less than the predetermined value.

3. A fluid pressure system comprising a pair of brakes, a pair of motors for energizing said brakes, a pair of fluid pressure sources, a spring setting pressure released brake actuator connected with one of said brakes, means for applying fluid pressure from said sources to said motors effecting energization of said brakes and to said brake actuator, respectively, and for venting the fluid pressure applied to said brake actuator to the atmosphere under preselected conditions, said brake actuator being responsive to the fluid pressure applied thereto less than a predetermined value to effect spring set energization of one of said brakes, and other means for applying fluid pressure from one of said sources to one of said motors to energize the other of said brakes in response to the reduction of the fluid pressure applied to said brake actuator to a value less than the predetermined value.

4. A fluid pressure system according to claim 3, wherein said other means includes application means controlling pressure fluid communication between said one source and said one motor, said application means being movable in response to fluid pressure applied to said brake actuator less than the predetermined value toward an operative position communicating said one source and said one motor.

5. A fluid pressure system comprising a pair of brakes, a pair of motors for energizing said brakes, a pair of fluid pressure sources, a spring setting pressure released brake actuator connected with one of said brakes, means for applying fluid pressure from said sources to said motors effecting energization of said brakes and to said brake actuator, respectively, and for venting the fluid pressure applied to said brake actuator to the atmosphere under preselected conditions, said brake actuator being responsive to the fluid pressure applied thereto less than a predetermined value to effect spring set energization of one of said brakes, other means for applying fluid pressure from one of said sources to one of said motors to energize the other of said brakes in response to the reduction of the fluid pressure applied to said brake actuator to a value less than the predetermined value, said other means including application means controlling pressure fluid communication between said one source and said one motor, said application means being movable in response to fluid pressure applied to said brake actuator less than the predetermined value toward an operative position communicating said one source and said one motor, and said application means including resiliently urged means, an area on said resiliently urged means subjected to the fluid pressure applied to said brake actuator, said resiliently urged means being movable against its one force in response to the fluid pressure applied to said brake actuator in excess of the predetermined value acting on said area toward an inoperative position isolating said one source from said one brake and being movable toward its operative position in the event the fluid pressure applied to said brake actuator and acting on said area is reduced to a value less than the predetermined value.

6. A fluid pressure system according to claim 5, wherein said resiliently urged means includes piston means, said area being on said piston means, and spring means urging said piston means toward the operative position thereof.

7. A fluid pressure system according to claim 5, comprising another area on said resiliently urged means additive to said first named area and subjected to the fluid pressure applied from said one source to said one motor.

8. A fluid pressure system according to claim 7, wherein said first named area is predeterminately greater than said other area.

9. A fluid pressure system according to claim 7, wherein said application means includes resiliently urged means, an area on said resiliently urged means subjected to the supplied fluid pressure, said resiliently urged means being movable in response to its own force toward the operative position in said flow passage when the supplied fluid pressure acting on said area is less than the predetermined value.

10. A fluid pressure system according to claim 9, wherein said resiliently urged means includes piston means, said area being on said piston means, and spring means urging said piston means toward its operative position.

11. A fluid pressure system according to claim 10, wherein said piston means is movable toward an inoperative position against said spring means in response to the supplied fluid pressure in excess of the predetermined value acting on said area, valve means for engagement with said piston means controlling said flow passage, said piston means being movable in response to said spring means when the supplied fluid pressure acting on said area is less than the predetermined value toward the operative position to engage and actuate said valve means and effect the application through said flow passage of the fluid pressure from said other source to said first means.

12. A fluid pressure system according to claim 10, wherein said third means includes a valve seat about said flow passage, said valve means being urged into engagement with said valve seat to close said flow passage when said piston means is in its inoperative position, said valve means being actuated by said piston means upon the movement thereof toward the operative position and disengaged from said valve seat.

13. A fluid pressure system comprising a pair of brakes, a pair of fluid pressure sources, first means responsive to fluid pressure selectively applied thereto from one of said sources for energizing at least one of said brakes, second means responsive to fluid pressure supplied thereto from the other of said sources less than a predetermined value for energizing the other of said brakes, third means for applying fluid pressure from said other source to said first means to effect energization of said one brake in the event the supplied fluid pressure is reduced to a value less than the predetermined value, said third means including a pressure fluid flow passage connected between said other source and said first means, and application means for controlling said flow passage, said application means being movable in response to the supplied fluid pressure less than the predetermined value toward an operative position in said flow passage effecting the application therethrough of the fluid pressure from said other source to said first means.

14. A fluid pressure system according to claim 13, comprising valve means controlling said flow passage, said valve means being actuated by said application means upon the movement thereof to its operative position to effect the application through said flow passage of the fluid pressure from said other source to said first named means.

15. A fluid pressure system according to claim 11, wherein said third means includes a valve seat about said flow passage, said valve means being normaly urged into engagement with said valve seat to close said flow passage and interrupt pressure fluid communication between said other source and said first means, said valve means being disengaged from said valve seat to establish the pressure fluid communication between said other source and said first means upon the actuation of said valve means by said application means.

16. A fluid pressure system comprising a pair of brakes, a source of service pressure, a source of emergency pressure, a pair of service motors connected with said brakes, a spring setting pressure released brake actuator also connected with one of said brakes, an operator actuated application valve having service and emergency portions respectively connected with said service and emergency pressure sources including first means in said service portion selectively movable upon operator actuation of said application valve to effect the application of service pressure from the source thereof to said service motors for energizing said brakes, and second means in said emergency portion normally applying emergency fluid pressure from the source thereof to said brake actuator and movable to isolate said emergency pressure source from said brake actuator and vent the emergency pressure from said brake actuator to the atmosphere under preselected conditions, said brake actuator being responsive to the reduction of the emergency pressure therefrom to a predetermined value to effect spring set energization of said one brake, an emergency brake valve including a housing, a flow passage in said housing connected between said emergency pressure source and one of said service motors, valve means controlling said flow passage, a chamber in said housing connected with the emergency fluid pressure supplied to said actuator and separate from said flow passage, a valve actuating member movable in said chamber including a stem portion extending into said flow passage for operative engagement with said valve means, spring means engaged with said valve actuating member and opposing fluid pressure expansion of said chamber, an area on said valve actuating member subjected to the emergency fluid pressure in said chamber, said valve actuating member being movable against the force of said spring means in response to the emergency fluid pressure on said chamber in excess of a predetermined value acting on said area and said valve actuating member also being movable in response to the force of said spring means when the emergency fluid pressure in said chamber acting on said area is reduced to a value less than the predetermined value to engage said stem portion with said valve means and move said valve means toward a position in said flow passage effecting the application therethrough of the emergency pressure from the source thereof to said one service motor for energizing the other of said brakes, and another area on said stem portion in said flow passage additive to said first named area and subjected to the emergency pressure applied therethrough to said one service motor to oppose the force of said spring means.

* * * * *

UNITED STATES PATENT OFFICE
CERTIFICATE OF CORRECTION

Patent No. 3,746,400        Dated  July 17, 1973

Inventor(s)   Oliver B. Cruse

It is certified that error appears in the above-identified patent and that said Letters Patent are hereby corrected as shown below:

Column 9, line 1, "11" should read -- 14 --; line 3, "normaly" should read -- normally --.

Signed and sealed this 26th day of March 1974.

(SEAL)
Attest:

EDWARD M. FLETCHER, JR.
Attesting Officer

C. MARSHALL DANN
Commissioner of Patents